United States Patent
Tomari et al.

(10) Patent No.: US 9,095,999 B2
(45) Date of Patent: Aug. 4, 2015

(54) CHARGING MEMBER, CHARGING UNIT, PROCESS CARTRIDGE, IMAGE FORMING APPARATUS, AND METHOD OF MANUFACTURING CHARGING MEMBER

(71) Applicant: FUJI XEROX CO., LTD., Tokyo (JP)

(72) Inventors: Shogo Tomari, Kanagawa (JP); Hiroyuki Miura, Kanagawa (JP); Takahiko Hattori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/190,776

(22) Filed: Feb. 26, 2014

(65) Prior Publication Data
US 2015/0016844 A1    Jan. 15, 2015

(30) Foreign Application Priority Data
Jul. 2, 2013   (JP) .................................. 2013-139297

(51) Int. Cl.
| | |
|---|---|
| *G03G 15/02* | (2006.01) |
| *B29C 47/02* | (2006.01) |
| *B29C 47/00* | (2006.01) |
| B29C 47/88 | (2006.01) |
| B29L 31/32 | (2006.01) |
| B29L 31/34 | (2006.01) |
| B29K 19/00 | (2006.01) |
| B29K 509/00 | (2006.01) |
| B29C 47/06 | (2006.01) |
| B29C 35/02 | (2006.01) |
| B29C 47/68 | (2006.01) |
| B29C 47/70 | (2006.01) |

(52) U.S. Cl.
CPC ........... *B29C 47/025* (2013.01); *B29C 47/0016* (2013.01); *G03G 15/0233* (2013.01); *B29C 35/02* (2013.01); *B29C 47/065* (2013.01); *B29C 47/686* (2013.01); *B29C 47/705* (2013.01); *B29C 47/8805* (2013.01); *B29K 2019/00* (2013.01); *B29K 2509/00* (2013.01); *B29K 2995/0005* (2013.01); *B29L 2031/324* (2013.01); *B29L 2031/3406* (2013.01); *Y10T 428/2927* (2015.01)

(58) Field of Classification Search
CPC ............... G03G 15/02; G03G 15/0233; B29C 47/8805; B29C 47/025; B29L 2031/324
USPC ........................ 399/176; 428/372; 264/171.24
See application file for complete search history.

(56) References Cited

U.S. PATENT DOCUMENTS

| | | | |
|---|---|---|---|
| 5,156,781 A | 10/1992 | Böhm et al. | |
| 5,267,847 A | 12/1993 | Bohm et al. | |
| 8,622,881 B1 * | 1/2014 | Harada et al. ................ | 399/176 |
| 2004/0062940 A1 * | 4/2004 | Miyamori et al. ............ | 428/492 |
| 2012/0213553 A1 * | 8/2012 | Hoshio ......................... | 399/176 |

FOREIGN PATENT DOCUMENTS

| | | |
|---|---|---|
| JP | A-5-116200 | 5/1993 |
| JP | A-2008-116642 | 5/2008 |

* cited by examiner

*Primary Examiner* — Sophia S Chen
(74) *Attorney, Agent, or Firm* — Oliff PLC (57) ABSTRACT

A charging member includes a conductive support, and a conductive elastic layer that is provided on an outer peripheral surface of the conductive support and includes a rubber material and inorganic particles, and in which an average dispersion degree of aggregates of the inorganic particles is 95% or greater and a maximum particle diameter of the aggregates of the inorganic particles is 200 μm or less.

11 Claims, 7 Drawing Sheets

CHARGING MEMBER, CHARGING UNIT, PROCESS CARTRIDGE, IMAGE FORMING APPARATUS, AND METHOD OF MANUFACTURING CHARGING MEMBER

CROSS-REFERENCE TO RELATED APPLICATIONS

This application is based on and claims priority under 35 USC 119 from Japanese Patent Application No. 2013-139297 filed Jul. 2, 2013.

BACKGROUND

1. Technical Field

The present invention relates to a charging member, a charging unit, a process cartridge, an image forming apparatus, and a method of manufacturing the charging member.

2. Related Art

In electrophotographic image forming apparatuses, first, a charge is formed using a charging unit on a surface of an image holding member formed of a photoconductive photoreceptor including an inorganic or organic material to form an electrostatic latent image by laser light or the like obtained by modulating an image signal, and then the electrostatic latent image is developed with a charged toner to form a visualized toner image. The toner image is electrostatically transferred to a transfer material such as recording paper either directly or via an intermediate transfer member, and is fixed to the recording material to obtain a reproduced image.

SUMMARY

According to an aspect of the invention, there is provided a charging member including: a conductive support; and a conductive elastic layer that is provided on an outer peripheral surface of the conductive support and includes a rubber material and inorganic particles, and in which an average dispersion degree of aggregates of the inorganic particles is 95% or greater and a maximum particle diameter of the aggregates of the inorganic particles is 200 μm or less.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail.

Charging Member

Figure 1:
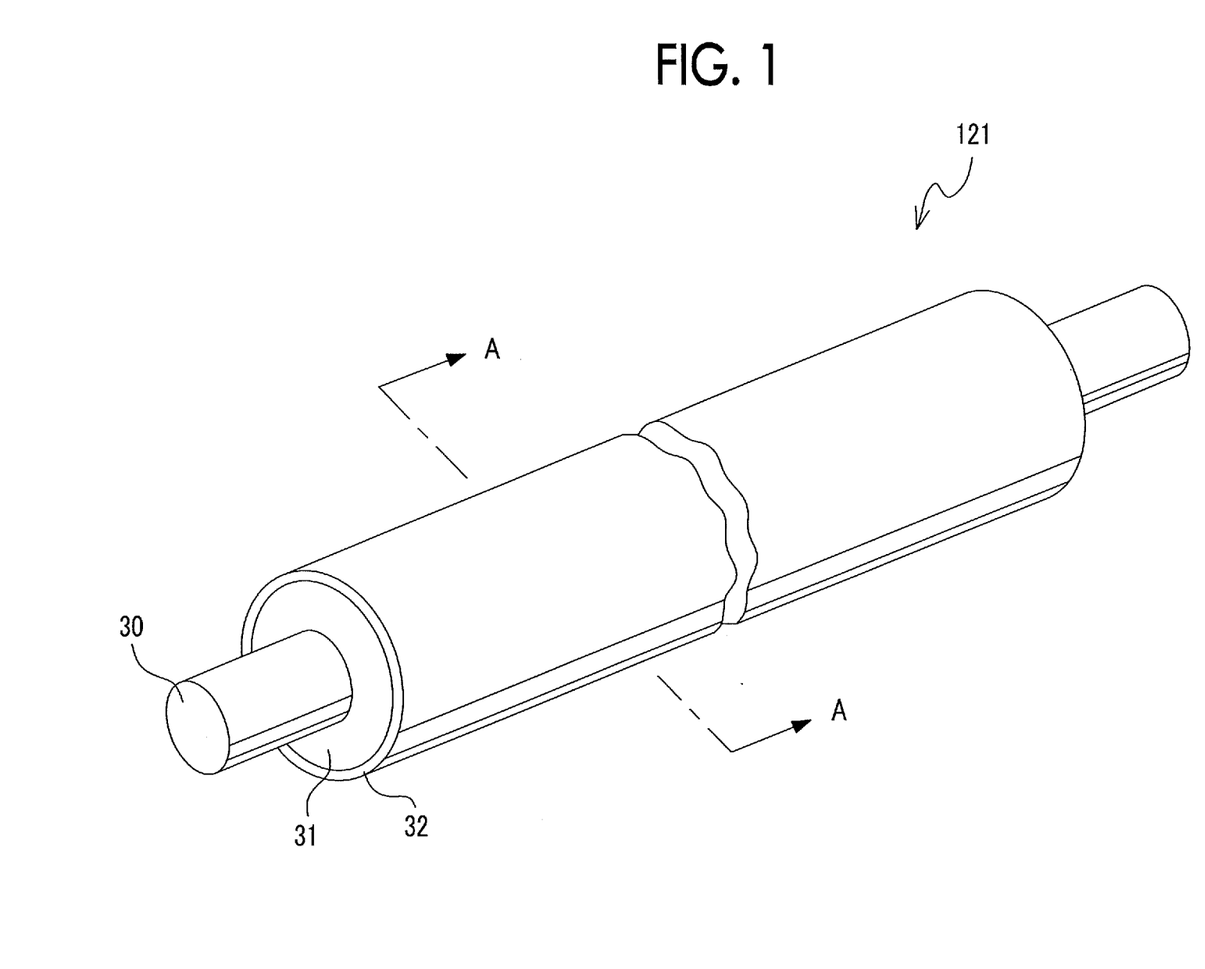
FIG. 1 is a perspective view schematically showing a charging member according to an exemplary embodiment.
Figure 2:
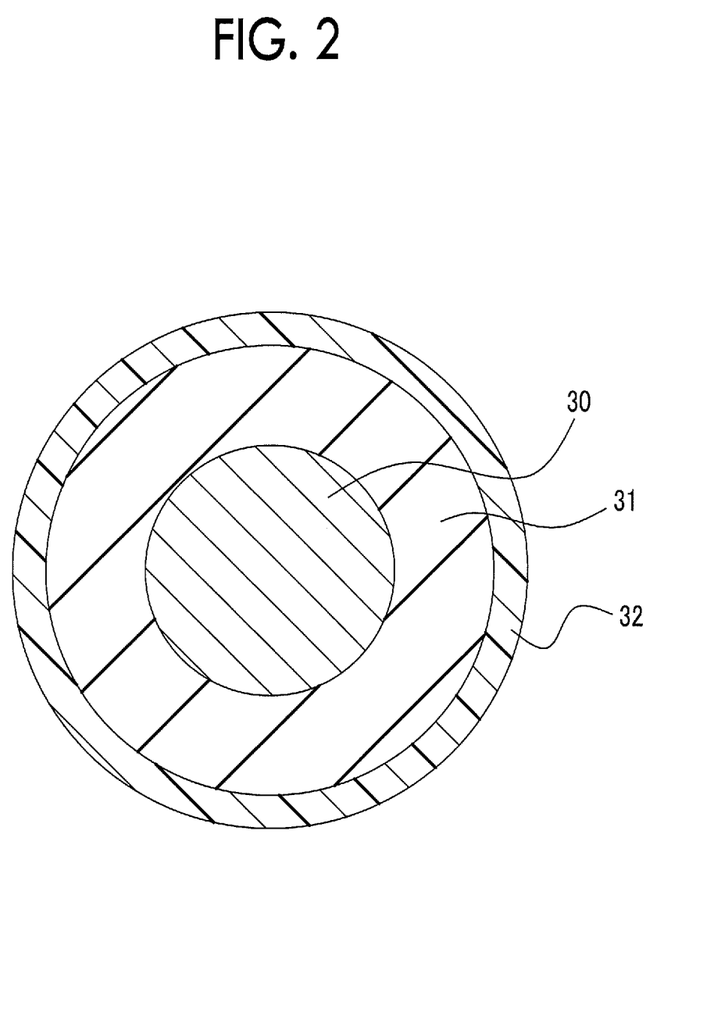
FIG. 2 is a cross-sectional view schematically showing the charging member according to the exemplary embodiment.

FIG. 1 is a perspective view schematically showing a charging member according to an exemplary embodiment. FIG. 2 is a cross-sectional view schematically showing the charging member according to the exemplary embodiment. FIG. 2 is a cross-sectional view taken along the line A-A of FIG. 1.

As shown in FIGS. 1 and 2, a charging member 121 according to this exemplary embodiment is, for example, a roll member having a conductive support (shaft) 30, a conductive elastic layer 31 that is provided on an outer peripheral surface of the conductive support 30, and a conductive surface layer 32 that is provided on an outer peripheral surface of the conductive elastic layer 31. For example, an adhesive layer (not shown) is provided between the conductive support 30 and the conductive elastic layer 31.

The conductive elastic layer 31 includes a rubber material and inorganic particles. An average dispersion degree of aggregates of the inorganic particles is 95% or greater, and a maximum particle diameter of the aggregates of the inorganic particles is 200 μm or less.

The charging member 121 according to this exemplary embodiment is not limited to the above-described configuration. For example, the charging member 121 may be configured without the conductive surface layer 32, configured to have an intermediate layer between the conductive support 30 and the conductive elastic layer 31, configured to have a resistance adjustment layer or a transfer prevention layer between the conductive elastic layer 31 and the conductive surface layer 32, or configured to have a coating layer (protective layer) on the outside (outermost surface) of the conductive surface layer 32.

In this specification, "conductivity" means that the volume resistivity at 20° C. is less than $1 \times 10^{13}$ Ωcm.

It is known that hitherto, in a charging member having a conductive elastic layer, the conductive elastic layer is formed by mixing an inorganic conductive material (for example, carbon black or metal oxide particles) with an unvulcanized rubber material to impart conductivity and by performing kneading, molding, and vulcanization. It is also known that an inorganic filler is mixed with the unvulcanized rubber material to achieve shape stability of the conductive elastic layer and low cost.

However, the inorganic particles such as the inorganic conductive material and the inorganic filler may form aggregates by being blended with, for example, a softener, a plasticizer, or the like to be mixed with the unvulcanized rubber material and by being rolled. It has been found that when the aggregates remain in the conductive elastic layer, unevenness in electric resistance occurs. When the unevenness in electric resistance occurs, unevenness in charging occurs in a charged member.

Therefore, in the charging member 121 according to this exemplary embodiment, the average dispersion degree of the aggregates of the inorganic particles in the conductive elastic layer 31 is adjusted to 95% or greater, and the maximum particle diameter of the aggregates of the inorganic particles is adjusted to 200 μm or less. These show that the amount of the aggregates of the inorganic particles is small in the conductive elastic layer 31 and non-aggregated inorganic particles are approximately uniformly dispersed. Therefore, in the charging member 121 according to this exemplary embodiment, the occurrence of unevenness in charging is prevented.

Particularly, in the case in which the surface of the conductive elastic layer is cut using a polishing machine to shape the charging member into a crown or the like, when aggregates of the inorganic particles are present in the conductive elastic layer, a portion in which aggregates of the inorganic particles are poorly dispersed is exposed to the surface of the layer, and thus unevenness in charging significantly easily occurs. However, in this case, in the charging member 121 according to this exemplary embodiment, the occurrence of unevenness in charging is prevented.

In the charging member 121 according to this exemplary embodiment, for example, an unvulcanized rubber composition that contains an unvulcanized rubber material and inorganic particles and is subjected to straining is preferably used to form the conductive elastic layer in order to adjust the average dispersion degree and the maximum particle diameter of the aggregates of the inorganic particles within the above ranges. In addition, for example, a weight ratio of the unvulcanized rubber material to the inorganic particles in the unvulcanized rubber composition is preferably not changed before and after the straining.

Usually, pulverization of the aggregates of the inorganic particles and an improvement in dispersibility of the aggregates of the inorganic particles are realized in a process of kneading with the unvulcanized rubber material. In general, the kneading process is performed with a kneading line in which a kneader such as a pressure kneader and a Banbury mixer and an open roll provided with two rolls are arranged, and the respective kneading conditions are optimized to realize the pulverization of the aggregates of the inorganic particles and an improvement in dispersibility of the aggregates of the inorganic particles.

The kneader such as a pressure kneader and a Banbury mixer is a kneader that presses and puts a rubber material into a mixing vessel and performs mixing thereof with two rotors having a long blade and a short blade in the mixing vessel. Regarding the mixing, mixing and dispersion are carried out mainly by a shearing force of the inner wall of the mixing vessel and tip ends of the long and short blades of the rotors, but due to a wide interval between gaps, the dispersion of the inorganic particles and the pulverization of the aggregates of the inorganic particles are not sufficiently performed. In addition, in the case of the open roll, there is a restriction in the gap between the rolls, and thus the dispersion of the inorganic particles and the pulverization of the aggregates of the inorganic particles are not sufficiently performed.

Meanwhile, as for the straining, a shearing force is imparted to sufficiently disperse the inorganic particles and to sufficiently pulverize the aggregates of the inorganic particles by straining, that is a process of pressing an unvulcanized rubber composition obtained by mixing an unvulcanized rubber material and inorganic particles using a kneader into a strainer having a breaker plate and plural screen meshes to allow the unvulcanized rubber composition to pass through the strainer. As a result, in the conductive elastic layer 31, the average dispersion degree and the maximum particle diameter of the aggregates of the inorganic particles are easily adjusted within the above ranges.

By performing the straining, it is not necessary to perform the kneading process using an open roll. Therefore, the number of processes of manufacturing the charging member is reduced and low cost is thus realized.

It is considered that in the unvulcanized rubber composition, when the weight ratio of the unvulcanized rubber material to the inorganic particles is not changed before and after the straining, the inorganic particles do not stay with a strainer mesh, and thus the inorganic filler is efficiently crushed by straining. Therefore, when the weight ratio of the unvulcanized rubber material to the inorganic particles is not changed before and after the straining, the average dispersion degree and the maximum particle diameter of the inorganic particles are easily adjusted within the above ranges.

Here, in the unvulcanized rubber composition, the fact that the weight ratio of the unvulcanized rubber material to the inorganic particles is not changed before and after the straining means that a ratio of the change of the weight ratio after the straining to the weight ratio before the straining is within 1.0%.

Hereinafter, the charging member 121 according to this exemplary embodiment will be described in detail. The reference numerals will be omitted below.

Conductive Support

Examples of the material of the conductive support include metals or alloys such as aluminum, copper alloy, and stainless steel; iron plated with chromium, nickel, or the like; and conductive materials such as conductive resins.

The conductive support functions as an electrode and a support member of the charging member. Examples of the material thereof include metals such as iron (free-cutting steel), copper, brass, stainless steel, aluminum, and nickel or alloys thereof; and iron plated with chromium, nickel, or the like. Examples of the conductive support include a member (for example, a resin member or a ceramic member) whose outer peripheral surface has been plated, and a member (for example, a resin member or a ceramic member) in which a conductive material has been dispersed. The conductive support may be a hollow member (tubular member) or a non-hollow member.

Conductive Elastic Layer

The conductive elastic layer contains a rubber material and inorganic particles, and if necessary, other additives. Specifically, the conductive elastic layer is formed of, for example, a vulcanized product of an unvulcanized rubber composition containing an unvulcanized rubber material and inorganic particles, and if necessary, other additives.

In the conductive elastic layer, the average dispersion degree of aggregates of the inorganic particles is 95% or greater (preferably 98% or greater), and the maximum particle diameter of the aggregates of the inorganic particles is 200 μm or less (preferably 150 μm or less). The maximum particle diameter of the aggregates of the inorganic particles is preferably 1 μm or greater in consideration of obtaining approximately uniform dispersibility of the aggregates of the inorganic particles.

Here, the average dispersion degree of the aggregates of the inorganic particles and the maximum particle diameter of the aggregates of the inorganic particles are values measured according to the methods described in "Examples" to be described later.

Rubber Material

Examples of the rubber material include elastic materials that have at least a double bond in a chemical structure and have a structure to be cross-linked by a vulcanization reaction.

Specific examples of the rubber material include isoprene rubbers, chloroprene rubbers, epichlorohydrin rubbers, butyl rubbers, polyurethane, silicone rubbers, fluorine rubbers, styrene-butadiene rubbers, butadiene rubbers, nitrile rubbers, ethylene propylene rubbers, epichlorohydrin-ethylene oxide copolymer rubbers, epichlorohydrin-ethylene oxide-allyl glycidyl ether copolymer rubbers, ethylene-propylene-diene terpolymer rubbers (EPDM), acrylonitrile-butadiene copolymer rubbers (NBR), natural rubbers, and combinations thereof.

Of the rubber materials, polyurethane, EPDM, epichlorohydrin-ethylene oxide copolymer rubbers, epichlorohydrin-ethylene oxide-allyl glycidyl ether copolymer rubbers, NBR, and combinations thereof are preferable.

The rubber materials may be foamed or unfoamed.

Inorganic Particles

At least one selected from the inorganic conductive material and the inorganic filler is exemplified as the inorganic particles.

Examples of the inorganic conductive material include electronic conductive materials. Specific examples thereof include powders of carbon black such as Ketjen black and acetylene black; thermal decomposition carbon, graphite; various conductive metals such as aluminum, copper, nickel, and stainless steel or alloys thereof; various conductive metal oxides such as tin oxide, indium oxide, titanium oxide, tin oxide-antimony oxide solid solution, and tin oxide-indium oxide solid solution; and insulating materials of which the surface is processed to have conductivity. The inorganic conductive materials may be used singly or in mixture of two or more types.

Here, specific examples of commercial products of the carbon black include "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", and "COLOR BLACK FW2V", all of which are manufactured by Evonik Degussa Corporation, and "MONARCH 1000", "MONARCH 1300", "MONARCH 1400", "MOGUL-L", and "REGAL 400R", all of which are manufactured by Cabot Corporation.

The content of the inorganic conductive material is, for example, preferably from 1 part by weight to 80 parts by weight, and more preferably 15 parts by weight to 25 parts by weight with respect to 100 parts by weight of the rubber material.

Specific examples of the inorganic filler include calcium carbonate, carbon black, and silica. The inorganic fillers may be used singly or in mixture of two or more types.

The content of the inorganic filler is not particularly limited, and for example, preferably from 1 part by weight to 80 parts by weight, and more preferably from 10 parts by weight to 50 parts by weight with respect to 100 parts by weight of the rubber material.

Other examples of the inorganic particles include acid acceptors. Examples of the acid acceptor include powders of metal compounds and hydrotalcites.

Examples of the metal compounds include oxides, hydroxides, carbonates, carboxylates, silicates, borates, or phosphite of elements (alkaline earth metals) of Group II of the periodic table; and oxides, basic carbonates, basic carboxylates, basic phosphites, and tribasic sulfates of elements of Group IV of the periodic table. Specific examples thereof include magnesium oxide, magnesium hydroxide, barium hydroxide, magnesium carbonate, barium carbonate, calcium oxide, calcium hydroxide, calcium carbonate, calcium silicate, calcium stearate, zinc stearate, calcium phthalate, calcium phosphite, zinc white, tin oxide, tin stearate, and basic tin phosphite. The metal compounds may be used singly or in mixture of two or more types.

The content of the acid acceptor is not particularly limited, and for example, preferably from 0.5 part by weight to 20.0 parts by weight, and more preferably from 3.0 parts by weight to 10.0 parts by weight with respect to 100 parts by weight of the rubber material.

Other Additives

Examples of other additives include known additives such as other conductive materials (for example, an ion conductive material), a softener, a plasticizer, a vulcanizing agent, a vulcanization accelerator, an antioxidant, a surfactant, and a coupling agent.

Method of Forming Conductive Elastic Layer

The conductive elastic layer is formed, for example, by molding an unvulcanized rubber composition containing an unvulcanized rubber material and inorganic particles, and if necessary, other additives into a layer shape on the conductive support through extrusion molding, and by then performing vulcanization under ordinary pressure.

Hereinafter, the method of forming the conductive elastic layer will be further described in detail.

First, an unvulcanized rubber composition is obtained by kneading an unvulcanized rubber material and inorganic particles, and if necessary, other additives using a kneader. Examples of the kneader include a tangent-type closed kneader and an engagement-type closed kneader.

Next, the unvulcanized rubber composition is preferably subjected to straining. The straining is performed by allowing the unvulcanized rubber composition to pass through a strainer having a breaker plate and plural screen meshes. Specifically, the straining is performed using, for example, an extruder with a strainer attached to an extrusion port. Examples of the extruder include a single-screw extruder, a twin-screw tapered extruder, and a gear pump extruder.

Figure 3:
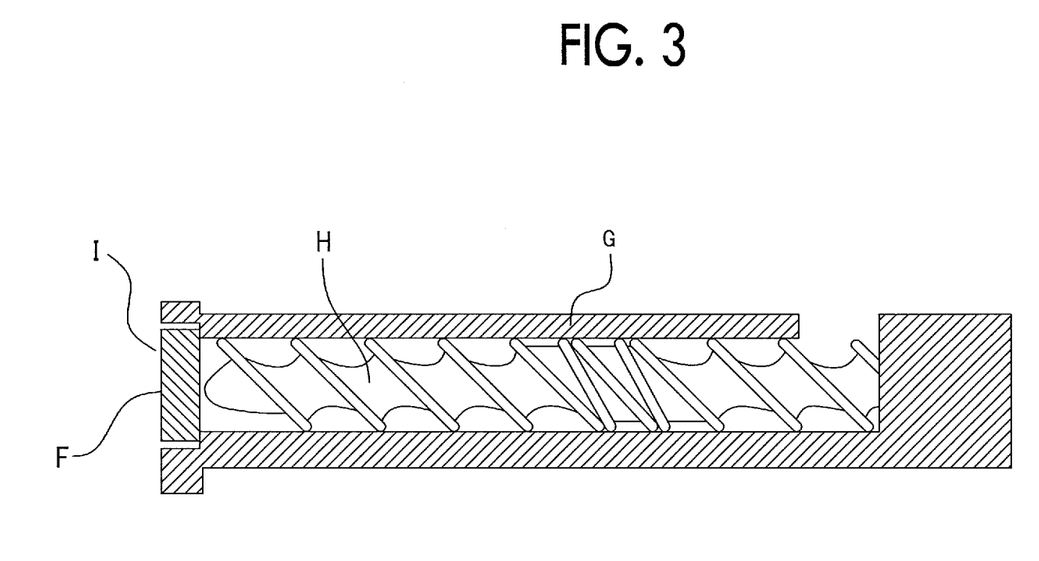
FIG. 3 is a diagram schematically showing a configuration of an extruder with a strainer attached to an extrusion port.

For example, as shown in FIG. 3, the strainer is attached to the extrusion port of the extruder. Specifically, as shown in FIG. 4, the strainer is configured so that a breaker plate, a screen mesh 1, a screen mesh 2, a screen mesh 3, and a screen mesh 4 are arranged in this order, from the downstream side to the upstream side in the extrusion direction of the unvulcanized rubber composition, with intervals therebetween, and is attached to the extrusion port of the extruder.

Figure 4:
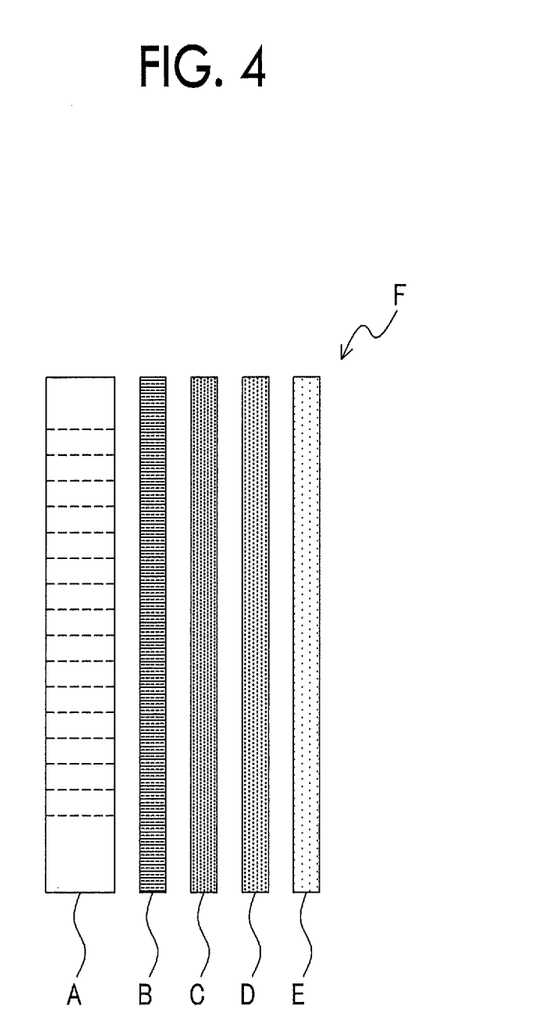
FIG. 4 is a diagram schematically showing a configuration of the strainer.

In FIGS. 3 and 4, A represents the breaker plate, B represents the screen mesh 1, C represents the screen mesh 2, D represents the screen mesh 3, E represents the screen mesh 4, and F represents the strainer. In addition, G represents a cylindrical main body portion of the extruder, H represents an extrusion screw provided in the cylindrical main body portion, and I represents the extrusion port of the extruder.

In the strainer for performing the straining, each screen mesh is formed of, for example, known knitted fabric such as plain weaves, twill weaves, and tatami weaves. The material of each screen mesh is selected from known materials (for example, stainless steel and iron) that are used in screen meshes.

Mesh sizes of each screen mesh are preferably within the following range in consideration of the fact that the average dispersion degree and the maximum particle diameter of the aggregates of the inorganic particles of the conductive elastic layer are adjusted within the above ranges by sufficiently pulverizing the aggregates of the inorganic particles while allowing the passage of the unvulcanized rubber composition and by improving the dispersibility of the aggregates of the inorganic particles in the unvulcanized rubber composition. The mesh sizes of the screen meshes are defined in JISG3556.

Mesh size of Screen Mesh 1: from 0.100 mm to 0.600 mm (preferably from 0.120 mm to 0.300 mm)

Mesh size of Screen Mesh 2: from 0.010 mm to 0.080 mm (preferably from 0.030 mm to 0.050 mm)

Mesh size of Screen Mesh 3: from 0.050 mm to 0.150 mm (preferably from 0.080 mm to 0.120 mm)

Mesh size of Screen Mesh 4: from 0.100 mm to 0.600 mm (preferably from 0.120 mm to 0.300 mm)

The attachment order of the screen meshes may be shifted except for the screen mesh 1. The number of the screen meshes and the mesh sizes thereof are not limited to the above description, and are selected so that the average dispersion degree and the maximum particle diameter of the aggregates of the inorganic particles of the conductive elastic layer are adjusted within the above ranges.

The breaker plate is a disc-like member having plural holes provided in a concentric manner. Specifically, in the breaker plate, plural holes having a diameter φ of from 1 mm to 6 mm are provided in a concentric manner so that the opening ratio with respect to the area of the breaker plate is from 30% to 60%.

Next, using an extruder (a single-screw extruder, a twin-screw tapered extruder, a gear pump extruder, or the like) having a cross head attached to the extrusion port, the unvulcanized rubber composition subjected to the straining is extrusion-molded and coated into a layer shape on the outer peripheral surface of the conductive support. The method of coating with the unvulcanized rubber composition is not limited to the extrusion molding, and known various methods may be used. In this state, heating is performed to subject the layer-shaped unvulcanized rubber composition to vulcanization, thereby forming an elastic layer. The heating (vulcanization) is preferably performed under ordinary pressure (for example, under 1 atmosphere). A heatable cylindrical mold may be used in heating.

The straining and the extrusion molding may be performed using the same extruder. Specifically, in order to perform the extrusion molding, a cross head is attached to the extrusion port of the extruder with a strainer interposed therebetween, and an unvulcanized rubber is allowed to pass through the strainer and is then extruded through the cross head.

Physical Properties of Conductive Elastic Layer

The thickness of the conductive elastic layer varies with an apparatus to which the charging member is applied. For example, the thickness is preferably from 1 mm to 10 mm, and more preferably from 2 mm to 5 mm.

The volume resistivity of the conductive elastic layer varies with an apparatus to which the charging member is applied. For example, the volume resistivity is preferably from $10^4$ Ωcm to $10^{10}$ Ωcm, and more preferably from $10^5$ Ωcm to $10^9$ Ωcm.

Regarding the volume resistivity, a sheet-like measurement sample is collected from a conductive elastic phase and applied with a voltage adjusted so that the electric field (application voltage/thickness of composition sheet) is 1000 V/cm, to measure a current value after application of the voltage for 30 seconds using a measuring tool (resistivity chamber R12702A/B: manufactured by Advantest Corporation) and a high-resistance measuring tool (digital high-resistance/microammeter R8340A: manufactured by Advantest Corporation) to thereby calculate the volume resistivity using the following expression: Volume Resistivity (Ω·cm) (19.63×application voltage (V))/(current value (A)×thickness of measurement sample sheet (cm))

Conductive Surface Layer

The conductive surface layer is configured to include, for example, a resin and a conductive material, and if necessary, particles for imparting unevenness (specific surface roughness) to the surface of the surface layer and other additives.

Examples of the resin that is mixed in the surface layer include acrylic resins, cellulose resins, polyamide resins, copolymerized nylons, polyurethane resins, polycarbonate resins, polyester resins, polyethylene resins, polyvinyl resins, polyarylate resins, styrene butadiene resins, melamine resins, epoxy resins, urethane resins, silicone resins, fluororesins (for example, tetrafluoroethylene/perfluoro (alkyl vinyl ether) copolymers, tetrafluoroethylene-hexafluoropropylene copolymers, and polyvinylidene fluoride), and urea resins.

Here, the copolymerized nylons include any one or more of nylon 610, nylon 11, and nylon 12 as polymerization units, and examples of other polymerization units that are included in the copolymer include nylon 6 and nylon 66.

The rubber material that is mixed in the elastic layer may be applied as a resin.

Examples of the conductive material that is mixed in the conductive surface layer include electronic conductive materials and ion conductive materials. Examples of the electronic conductive materials include powders of carbon black such as Ketjen black and acetylene black; thermal decomposition carbon, graphite; various conductive metals such as aluminum, copper, nickel, and stainless steel or alloys thereof; various conductive metal oxides such as tin oxide, indium oxide, titanium oxide, tin oxide-antimony oxide solid solution, and tin oxide-indium oxide solid solution; and insulating materials of which the surface is processed to have conductivity. Examples of the ion conductive materials include perchlorates and chlorates of tetraethyl ammonium and lauryl trimethyl ammonium; alkali metals such as lithium and magnesium, and perchlorates and chlorates of alkaline earth metals. The conductive materials may be used singly or in combination of two or more types.

Here, specific examples of commercial products of the carbon black include "SPECIAL BLACK 350", "SPECIAL BLACK 100", "SPECIAL BLACK 250", "SPECIAL BLACK 5", "SPECIAL BLACK 4", "SPECIAL BLACK 4A", "SPECIAL BLACK 550", "SPECIAL BLACK 6", "COLOR BLACK FW200", "COLOR BLACK FW2", and "COLOR BLACK FW2V", all of which are manufactured by Evonik Degussa Corporation, and "MONARCH 1000", "MONARCH 1300", "MONARCH 1400", "MOGUL-L", and "REGAL 400R", all of which are manufactured by Cabot Corporation.

The particles for imparting unevenness (specific surface roughness) to the surface of the conductive surface layer may be conductive particles or non-conductive particles, but are preferably non-conductive particles. Examples of the conductive particles include particles of the materials exemplified as the conductive material that is mixed in the elastic layer. Examples of the non-conductive particles include resin particles (polyimide resin particles, methacrylic resin particles, polystyrene resin particles, fluororesin particles, silicone resin particles and the like), inorganic particles (clay particles, kaolin particles, talc particles, silica particles, alumina particles, and the like), and ceramic particles. The particles may be composed of the same resin as the resin described above. As a result, miscibility between the particles and the resin is improved and adhesion between the particles and the resin is thus enhanced.

Here, the term "conductive" means that the volume resistivity is less than $10^{13}$ Ωcm, and the term "non-conductive" means that the volume resistivity is $10^{13}$ Ωcm or greater. Hereinafter, the same will be applied.

Examples of other additives in the conductive surface layer include materials, that may be commonly added to the surface layer, such as a conductive material, a curing agent, a vulcanizing agent, a vulcanization accelerator, an antioxidant, a surfactant, and a coupling agent.

The thickness of the conductive surface layer is preferably from 7 μm to 25 μm. In addition, the volume resistivity of the surface layer is preferably from $10^3$ Ωcm to $10^{14}$ Ωcm.

The resin, the conductive material, or the like is dispersed in a solvent to prepare a coating liquid and the coating liquid is applied to the formed elastic layer to form the conductive surface layer.

Examples of the method of applying the coating liquid include a blade coating method, a Meyer Bar coating method, a spray coating method, a dipping coating method, a bead coating method, an air knife coating method, and a curtain coating method.

The solvent that is used in the coating liquid is not particularly limited, and may be a general solvent. Examples of the solvent include alcohols such as methanol, ethanol, propanol, and butanol; ketones such as acetone and methyl ethyl ketone; tetrahydrofuran; and ethers such as diethyl ether and dioxane. In addition, various other solvents may also be used. The solvent used in a dipping coating method that is commonly used for production of electrophotographic photoreceptors may be a solvent such as alcohol or ketone or a mixture thereof.

Method of Manufacturing Charging Member

The charging member according to this exemplary embodiment may be manufactured by subjecting an unvulcanized rubber composition to straining, and molding the unvulcanized rubber composition into a layer shape on the outer peripheral surface of the conductive support through extrusion molding and then performing vulcanization to form the conductive elastic layer.

Charging Unit

Hereinafter, a charging unit according to this exemplary embodiment will be described.

Figure 5:
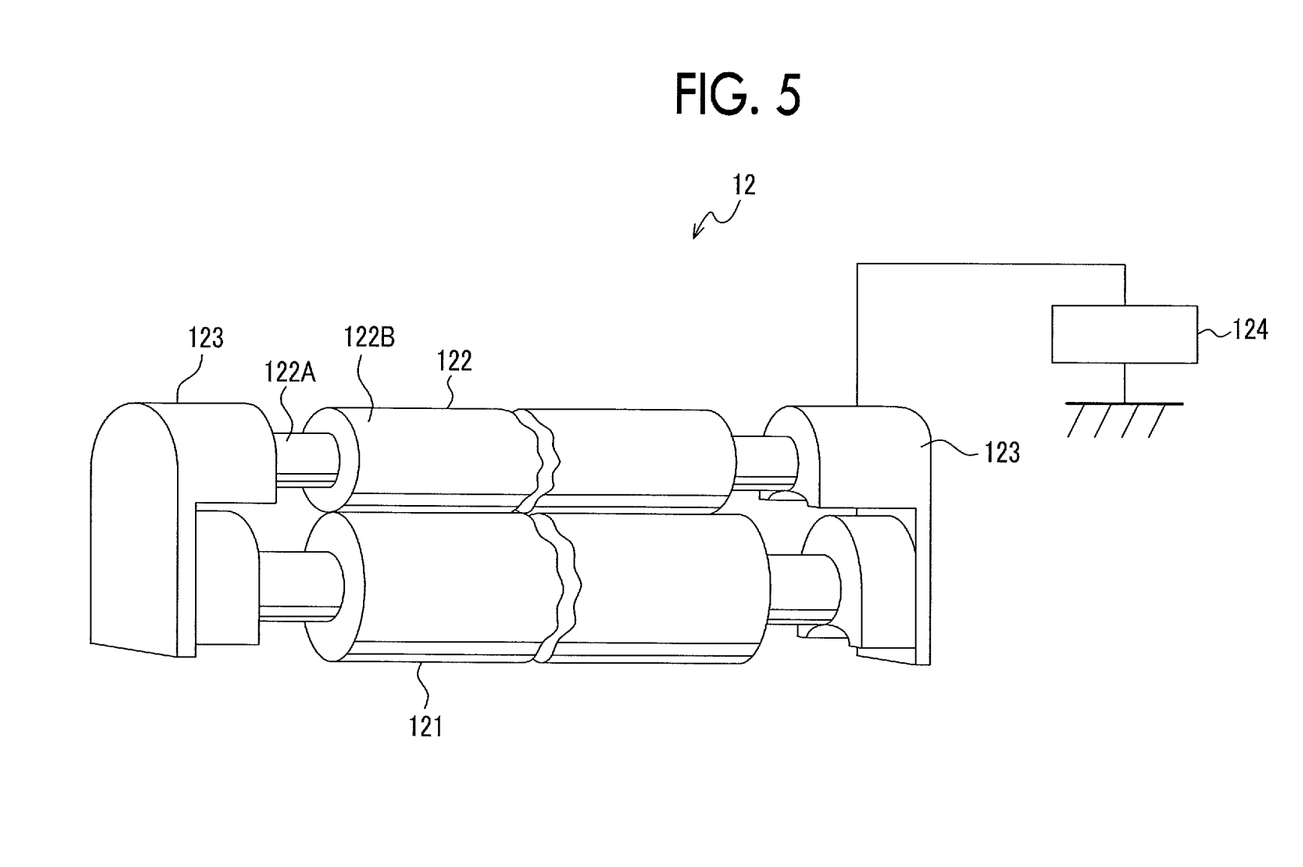
FIG. 5 is a perspective view schematically showing a charging unit according to the exemplary embodiment.

FIG. 5 is a perspective view schematically showing the charging unit according to this exemplary embodiment.

The charging unit according to this exemplary embodiment has a form in which the charging member according to this exemplary embodiment is applied as a charging member.

Specifically, as shown in FIG. 5, in a charging unit 12 according to this exemplary embodiment, for example, a charging member 121 and a cleaning member 122 are disposed to be brought into contact with each other in a specific bite-in amount. Both ends of a base member 30 of the charging member 121 and a base member 122A of the cleaning member 122 in an axial direction are held by conductive bearings 123 so that the members are rotatable. A power source 124 is connected to one of the conductive bearings 123.

The charging unit according to this exemplary embodiment is not limited to the above-described configuration, and for example, may have a form without the cleaning member 122.

The cleaning member 122 is a cleaning member for cleaning a surface of the charging member 121 and is configured to have a roll shape, for example. The cleaning member 122 has, for example, the cylindrical or columnar base member 122A and an elastic layer 122B on an outer peripheral surface of the base member 122A.

The base member 122A is a rod-like conductive member, and examples of the material thereof include metals such as iron (free-cutting steel and the like), copper, brass, stainless steel, aluminum, and nickel. In addition, examples of the base member 122A include a member (for example, a resin or ceramic member) of which the outer peripheral surface is subjected to plating and a member (for example, a resin or ceramic member) in which a conductive material is dispersed. The base member 122A may be a hollow member (tubular member) or a non-hollow member.

The elastic layer 122B is formed of a foam having a three-dimensional porous structure, has voids or unevenness (hereinafter, referred to as cells) therein or on the surface thereof, and preferably has elasticity. The elastic layer 122B includes foamed resin materials or rubber materials such as polyurethane, polyethylene, polyamide, olefin, melamine or polypropylene, acrylonitrile-butadiene copolymer rubber (NBR), ethylene-propylene-diene copolymer rubber (EPDM), natural rubber, styrene-butadiene rubber, chloroprene, silicone, and nitrile.

Among the foamed resin materials and rubber materials, polyurethane highly resistant to tearing and tensile strength is particularly properly used to efficiently remove foreign substances such as the toner and the external additives by the frictional sliding over the charging member 121, to make it difficult for the surface of the charging member 121 to be scratched due to the friction with the cleaning member 122, and to make it difficult to disconnect or damage the elastic layer for a long time.

The polyurethane is not particularly limited, and examples thereof include reactants of polyols (for example, polyester polyol, polyether polyester, and acrylpolyol) and isocyanates (2,4-tolylene diisocyanate, 2,6-tolylene diisocyanate, 4,4-diphenylmethane diisocyanate, tolidine diisocyanate, and 1,6-hexamethylene diisocyanate) and reactants based on chain extenders thereof (for example, 1,4-butanediol and trimethylolpropane). The polyurethane is typically foamed using a foaming agent (water or azo compounds (azodicarbonamide and azobisisobutyronitrile)).

The number of cells in the elastic layer 122B is preferably from 20/25 mm to 80/25 mm, more preferably from 30/25 mm to 80/25 mm, and even more preferably from 30/25 mm to 50/25 mm.

The hardness of the elastic layer 122B is preferably from 100 N to 500 N, more preferably from 100 N to 400 N, and even more preferably from 150 N to 400 N.

The conductive bearings 123 are members holding the charging member 121 and the cleaning member 122 so as to be rotatable together and maintaining the inter-shaft distance therebetween. The conductive bearings 123 may be formed of any material and may have any form, as long as they are formed of a conductive material. For example, conductive bearings or conductive sliding bearings are applied.

The power source 124 is a device that applies a voltage to the conductive bearings 123 to charge the charging member 121 and the cleaning member 122 to the same polarity and a known high-voltage power unit is used.

In the charging unit 12 according to this exemplary embodiment, the charging member 121 and the cleaning member 122 are charged to the same polarity by, for example, applying a voltage from the power source 124 to the conductive bearings 123.

Image Forming Apparatus and Process Cartridge

An image forming apparatus according to this exemplary embodiment includes an image holding member, a charging unit that charges the image holding member, a latent image forming unit that forms a latent image on a charged surface of the image holding member, a developing unit that develops the latent image formed on the surface of the image holding member with a toner to form a toner image, and a transfer unit that transfers the toner image formed on the surface of the image holding member to a recording medium. The above-described charging unit according to this exemplary embodiment is applied as the charging unit.

On the other hand, a process cartridge according to this exemplary embodiment is detachable from, for example, the image forming apparatus having the above-described configuration and includes an image holding member and a charging unit that charges the image holding member. The above-described charging unit according to this exemplary embodiment is used as the charging unit. The process cartridge according to this exemplary embodiment may include at least one selected from the group consisting of a developing unit that develops a latent image formed on a surface of the image holding member with a toner to form a toner image, a transfer unit that transfers the toner image formed on the surface of the image holding member to a recording medium, and a cleaning unit that removes the toner remaining on the surface of the image holding member after the transfer, if necessary.

Figure 6:
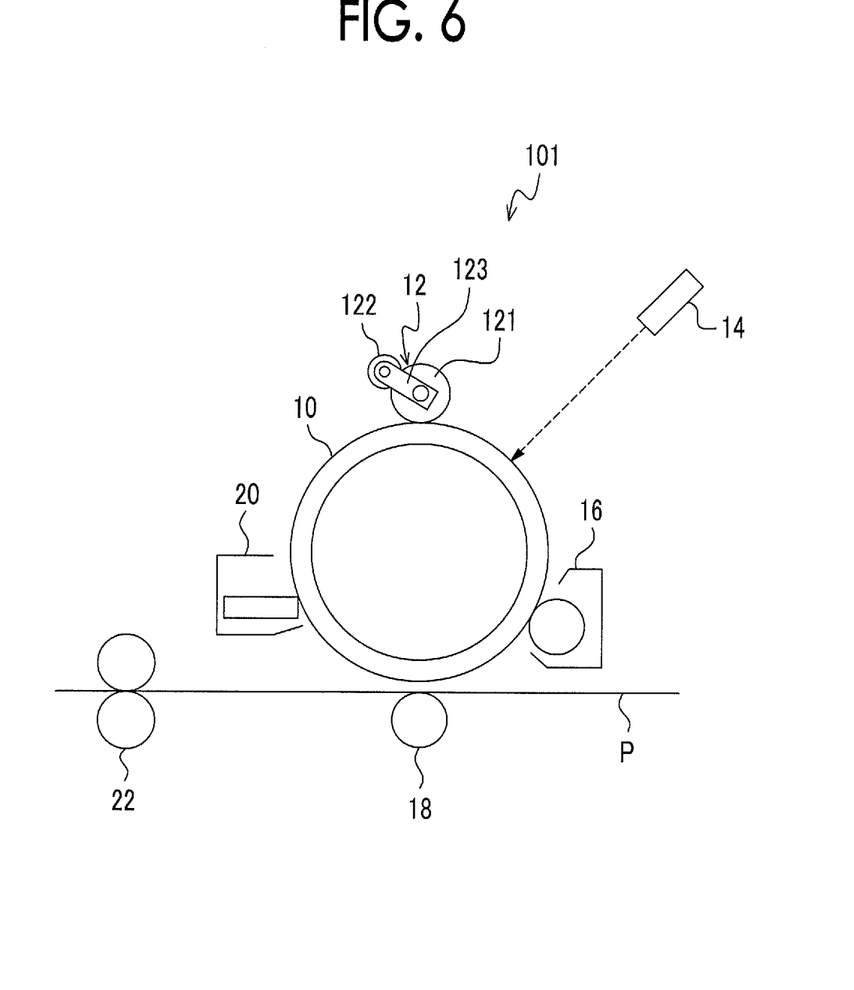
FIG. 6 is a diagram schematically showing a configuration of an image forming apparatus according to the exemplary embodiment.
Figure 7:
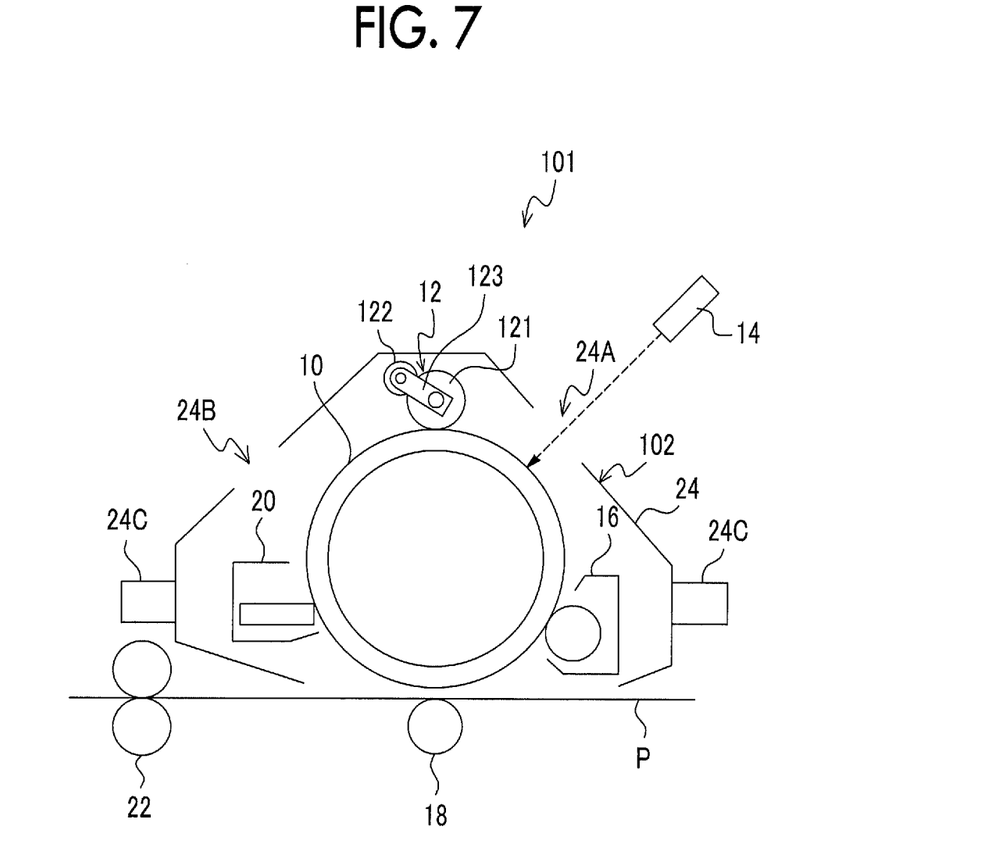
FIG. 7 is a diagram schematically showing a configuration of a process cartridge according to the exemplary embodiment.

The image forming apparatus and the process cartridge according to this exemplary embodiment will be described with reference to the drawings. FIG. 6 is a diagram schematically showing a configuration of the image forming apparatus according to this exemplary embodiment. FIG. 7 is a diagram schematically showing a configuration of the process cartridge according to this exemplary embodiment.

As shown in FIG. 6, an image forming apparatus 101 according to this exemplary embodiment includes an image holding member 10 and further includes a charging unit 12 charging the image holding member, an exposing unit 14 exposing the image holding member 10 charged by the charging unit 12 to form a latent image, a developing unit 16 developing the latent image formed by the exposing unit 14 with a toner to form a toner image, a transfer unit 18 transferring the toner image formed by the developing unit 16 to a recording medium P, and a cleaning unit 20 removing the toner remaining on the surface of the image holding member 10 after the transfer, around the image holding member 10. The image forming apparatus 101 further includes a fixing unit 22 fixing the toner image transferred to the recording medium P by the transfer unit 18.

The image forming apparatus 101 according to this exemplary embodiment employs as the charging unit 12 the charging unit according to this exemplary embodiment provided with the charging member 121, the cleaning member 122 disposed to be brought into contact with the charging member 121, the conductive bearings 123 holding both ends in the shaft direction of the charging member 121 and the cleaning member 122 so as to be independently rotatable, and the power source 124 connected to one of the conductive bearings 123.

On the other hand, the image forming apparatus 101 according to this exemplary embodiment employs the known constituents of an electrophotographic image forming apparatus according to the related art as the constituents other than the charging unit 12 (the charging member 121). An example of each constituent will be described below.

The image holding member 10 employs a known photoreceptor without any particular limitation, and a so-called function-divided organic photoreceptor in which a charge generating layer and a charge transporting layer are divided are suitably used. The image holding member 10 of which the surface layer is coated with a protective layer having a charge transporting function and a cross-linking structure is also preferably used. Examples of the cross-linking component of the protective layer preferably include photoreceptors formed of a siloxane-based resin, a phenol-based resin, a melamine resin, a guanamine resin, and an acrylic resin.

For example, a laser optical system or a light emitting diode (LED) array is used as the exposing unit 14.

The developing unit 16 is a developing unit that allows a developer holding member having a developer layer formed on the surface thereof to come in contact with or to get close to the image holding member 10 and the toner to attach to the latent image on the surface of the image holding member 10 to form a toner image. The developing method of the developing unit 16 employs a known developing method using a two-component developer. Examples of the developing method using the two-component developer include a cascade method and a magnetic brush method.

The transfer unit 18 may employ any of a non-contact-type transfer method, for example, using a corotron and a contact-type transfer method of bringing a conductive transfer roll into contact with the image holding member 10 with a recording medium P interposed therebetween and transferring the toner image to the recording medium P.

The cleaning unit 20 is a member bringing, for example, a cleaning blade into direct contact with surface of the image holding member 10 to remove the toner, paper powder, and dust attached to the surface. In the cleaning unit 20, a cleaning brush, a cleaning roll, or the like may be used instead of the cleaning blade.

As the fixing unit 22, a thermal fixing unit using a heating roll is suitably used. The thermal fixing unit includes, for example, a fixing roller in which a heater lamp for heating is provided in a cylindrical core and a heat-resistant resin coating film layer or a heat-resistant rubber coating film layer forms a so-called release layer on an outer peripheral surface of the heater lamp, and a pressure roller or a pressure belt that is disposed to be brought into contact into the fixing roller at a specific contact pressure and has a heat-resistant elastic body layer formed on an outer peripheral surface of a cylindrical core or a surface of a belt-like base member. A process of fixing an unfixed toner image includes, for example, inserting a recording medium P to which an unfixed toner image is transferred between the fixing roller and the pressure roller or the pressure belt to conduct fixing by thermofusion of the binder resin, additives and the like in the toner.

The image forming apparatus 101 according to this exemplary embodiment is not limited to the above-described configuration and may be an intermediate transfer type image forming apparatus employing an intermediate transfer member or a so-called tandem type image forming apparatus in which image forming units forming toner images of different colors are arranged in parallel.

On the other hand, as shown in FIG. 7, the process cartridge according to this exemplary embodiment is a process cartridge 102 in which the image holding member 10, the charging unit 12 charging the image holding member, the developing unit 16 developing the latent image formed by the exposing unit 14 with a toner to form a toner image, and the cleaning unit 20 removing the toner remaining on the surface of the image holding member 10 after the transfer are integrally combined, held, and configured by the use of a housing 24 including an opening 24A for exposure, an opening 24B for erasing exposure, and an attachment rail 24C in the image forming apparatus shown in FIG. 6. The process cartridge 102 is detachably attached to the image forming apparatus 101 shown in FIG. 6.

EXAMPLES

The invention will be described in more detail below with reference to examples, but the invention is not limited to the following examples. So long as not mentioned differently, "part" means "part by weight".

Example 1

Manufacturing of Charging Roll

Preparation of Rubber Composition

In manufacturing of a charging roll, a mixture having the following composition is kneaded using a tangent-type pressure kneader (manufactured by Moriyama Company: actual capacity: 75 L) and is allowed to pass through a strainer to prepare an unvulcanized rubber composition.

Specifically, temperatures of a jacket, a pressurizing lid, and a rotor of the pressure kneader are adjusted to 20° C. using circulating water, the pressure of the pressurizing lid is set to 0.6 MPa, the following elastic material is subjected to mastication, zinc oxide is kneaded, a stearic acid and carbon black are added thereto and kneaded, and an ion conductive material and calcium carbonate are added thereto and kneaded. In addition, the resultant material is cut in the form of a sheet using a twin-screw sheet pre-forming machine (manufactured by Moriyama Company: actual capacity: 75 L) and cooled to a room temperature (25° C.). Then, a vulcanizing agent and a vulcanization accelerator are added thereto, followed by kneading using the pressure kneader, and the resultant material is allowed to pass through a strainer having the following specification and to be subjected to screening using a gear pump extruder with the strainer attached to an extrusion port, whereby an unvulcanized rubber composition is obtained.

Composition

Elastic Material (epichlorohydrin-ethylene oxide-allylglycidylether copolymer rubber, product name "Gechron 3106", manufactured by Zeon Corporation): 100 parts by weight Zinc Oxide (product name "Zinc Oxide Type 2": manufactured by Seido Chemical Industry Co., Ltd.): 5 parts by weight Stearic Acid (product name "Stearic Acid S": manufactured by Kao Corporation): 1 part by weight Carbon Black (product name "Ketjen Black EC", manufactured by Lion Corporation): 15 parts by weight Calcium Carbonate (product name: "HAKUENKA CCR", manufactured by Shiraishi Kogyo Kaisha Ltd.): 20 parts by weight Ion Conductive Material (benzyl trimethyl ammonium chloride, product name "BTMAC" manufactured by Lion Akzo Co., Ltd.): 1 part by weight Vulcanizing Agent (product name "Sulfur 200 Mesh", manufactured by Tsurumi Chemical Industry Co., Ltd.): 1 part by weight Vulcanization Accelerator (product name "Nocceler DM", manufactured by Ouchi Shinko Chemical Industrial Co., Ltd.): 2 parts by weight Vulcanization Accelerator (product name "Nocceler TT", manufactured by Ouchi Shinko Chemical Industrial Co., Ltd.): 0.5 part by weight Specification of Strainer Breaker Plate: hole diameter φ5 mm, Opening Ratio 40%

Screen Mesh 1: Mesh size 0.350 mm

Screen Mesh 2: Mesh size 0.045 mm

Screen Mesh 3: Mesh size 0.100 mm

Screen Mesh 4: Mesh size 0.350 mm

The screen mesh numbers and the attachment positions of the screen meshes are based on the strainer shown in FIG. 4.

Formation of Conductive Elastic Layer

A conductive support made from SUS 303 that has a diameter of 8 mm and a length of 330 mm is prepared. The rubber composition is extruded at a screw rotation rate of 25 rpm using a single-screw rubber extruder in which an inner diameter of a cylinder is 60 mm and L1/D1 is 20 (L1 represents a length (mm) of the screw, D1 represents a diameter (mm) of the screw), and at the same time, the conductive support is allowed to continuously pass through a cross head to coat the unvulcanized rubber composition on the conductive support. As the temperature condition of the extruder, all of the cylinder, screw, head and die portions are set to 80° C. The unvulcanized rubber roll formed of the conductive support and the rubber composition coated thereon is subjected to vulcanization for 60 minutes at 160° C. using an air heating furnace. Accordingly, a conductive coating layer is formed on the outer peripheral surface of the conductive support.

Formation of Conductive Surface Layer

A mixture having the following composition is dispersed using a bead mill to prepare a dispersion. The obtained dispersion is diluted with methanol to obtain a conductive surface layer coating liquid. The viscosity of the coating liquid is adjusted to 45 mPa·s using methanol and butanol, and then the resultant material is injected to a dip coating vessel.

Thereafter, the manufactured conductive support to which the conductive elastic layer is attached is immersed in the coating liquid in the dip coating vessel and is moved upward. The conductive support is dried for 10 minutes at 150° C. to remove the solvent, and thus a conductive surface layer is formed.

Composition of Dispersion

Polymeric Material (amide resin, product name "Amilan CM8000", manufactured by Toray Industries, Inc.): 100 parts by weight Conductive Material (carbon black, product name "Monarch 1000", manufactured by Cabot Corporation): 14 parts by weight Solvent (methanol, manufactured by Kanto Chemical Co., Inc.): 500 parts by weight Solvent (butanol, manufactured by Kanto Chemical Co., Inc.): 240 parts by weight A charging roll having the conductive elastic layer and the conductive surface layer in this order on the outer peripheral surface of the conductive support is obtained through the above processes.

Example 2

An unvulcanized rubber composition is prepared in the same manner as in Example 1, except that the specification (mesh sizes of screen meshes) of a strainer for performing straining used in Example 1 is changed as follows, and a charging roll is obtained using the unvulcanized rubber composition.

Specification of Strainer

Screen Mesh 1: Mesh size 0.100 mm

Screen Mesh 2: Mesh size 0.010 mm

Screen Mesh 3: Mesh size 0.050 mm

Screen Mesh 4: Mesh size 0.100 mm

Example 3

An unvulcanized rubber composition is prepared in the same manner as in Example 1, except that the specification (mesh sizes of screen meshes) of a strainer for performing straining used in Example 1 is changed as follows, and a charging roll is obtained using the unvulcanized rubber composition.

Specification of Strainer

Screen Mesh 1: Mesh size 0.600 mm

Screen Mesh 2: Mesh size 0.080 mm

Screen Mesh 3: Mesh size 0.150 mm

Screen Mesh 4: Mesh size 0.600 mm

Example 4

An unvulcanized rubber composition is prepared in the same manner as in Example 1, except that the specification (mesh sizes of screen meshes) of a strainer for performing straining used in Example 1 is changed as follows, and a charging roll is obtained using the unvulcanized rubber composition.

Specification of Strainer

Screen Mesh 1: Mesh size 0.100 mm

Screen Mesh 2: Mesh size 0.010 mm

Screen Mesh 3: Mesh size 0.150 mm

Screen Mesh 4: Mesh size 0.600 mm

Example 5

An unvulcanized rubber composition is prepared in the same manner as in Example 1, except that the specification (mesh sizes of screen meshes) of a strainer for performing straining used in Example 1 is changed as follows, and a charging roll is obtained using the unvulcanized rubber composition.

Specification of Strainer
Screen Mesh 1: Mesh size 0.600 mm
Screen Mesh 2: Mesh size 0.080 mm
Screen Mesh 3: Mesh size 0.050 mm
Screen Mesh 4: Mesh size 0.100 mm

Example 6

An unvulcanized rubber composition is prepared in the same manner as in Example 1, except that the specification (mesh sizes of screen meshes) of a strainer for performing straining used in Example 1 is changed as follows, and a charging roll is obtained using the unvulcanized rubber composition.

Specification of Strainer
Screen Mesh 1: Mesh size 0.100 mm
Screen Mesh 2: Mesh size 0.010 mm
Screen Mesh 3: Mesh size 0.050 mm
Screen Mesh 4: Mesh size 0.600 mm

Example 7

An unvulcanized rubber composition is prepared in the same manner as in Example 1, except that the specification (mesh sizes of screen meshes) of a strainer for performing straining used in Example 1 is changed as follows, and a charging roll is obtained using the unvulcanized rubber composition.

Specification of Strainer
Screen Mesh 1: Mesh size 0.600 mm
Screen Mesh 2: Mesh size 0.080 mm
Screen Mesh 3: Mesh size 0.150 mm
Screen Mesh 4: Mesh size 0.100 mm

Example 8

An unvulcanized rubber composition is prepared in the same manner as in Example 1, except that the specification (mesh sizes of screen meshes) of a strainer for performing straining used in Example 1 is changed as follows, and a charging roll is obtained using the unvulcanized rubber composition.

Specification of Strainer
Screen Mesh 1: Mesh size 0.600 mm
Screen Mesh 2: Mesh size 0.080 mm
Screen Mesh 3: Mesh size 0.150 mm
Screen Mesh 4: Mesh size 0.600 mm

Comparative Example 1

In manufacturing of a charging roll, a mixture having the same composition as in Example 1 is kneaded using a tangent-type pressure kneader (manufactured by Moriyama Company: actual capacity: 75 L) and is allowed to pass through a strainer to prepare a rubber composition.

Specifically, temperatures of a jacket, a pressurizing lid, and a rotor of the pressure kneader are adjusted to 20° C. using circulating water, the pressure of the pressurizing lid is set to 0.6 MPa, an elastic material is subjected to mastication, zinc oxide is kneaded, a stearic acid and carbon black are added thereto and kneaded, and an ion conductive material and calcium carbonate are added thereto and kneaded. In addition, the resultant material is cut in the form of a sheet using a twin-screw sheet pre-forming machine (manufactured by Moriyama Company: actual capacity: 75 L) and cooled to a room temperature. Then, a vulcanizing agent and a vulcanization accelerator are added thereto, followed by kneading using the pressure kneader, and the resultant material is allowed to pass three times using a 22 inch open roll in which a gap between two rolls is 2 mm, whereby an unvulcanized rubber composition is obtained.

A charging roll is obtained in the same manner as in Example 1, except that this unvulcanized rubber composition is used.

Comparative Example 2

An unvulcanized rubber composition is prepared in the same manner as in Example 1, except that the specification (mesh sizes of screen meshes) of a strainer for performing straining used in Example 1 is changed as follows, and a charging roll is obtained using the unvulcanized rubber composition.

Specification of Strainer
Screen Mesh 1: Mesh size 0.080 mm
Screen Mesh 2: Mesh size 0.005 mm
Screen Mesh 3: Mesh size 0.030 mm
Screen Mesh 4: Mesh size 0.080 mm

Comparative Example 3

An unvulcanized rubber composition is prepared in the same manner as in Example 1, except that the specification (mesh sizes of screen meshes) of a strainer for performing straining used in Example 1 is changed as follows, and a charging roll is obtained using the unvulcanized rubber composition.

Specification of Strainer
Screen Mesh 1: Mesh size 0.800 mm
Screen Mesh 2: Mesh size 0.100 mm
Screen Mesh 3: Mesh size 0.160 mm
Screen Mesh 4: Mesh size 0.800 mm

Comparative Example 4

An unvulcanized rubber composition is prepared in the same manner as in Example 1, except that the specification (mesh sizes of screen meshes) of a strainer for performing straining used in Example 1 is changed as follows, and a charging roll is obtained using the unvulcanized rubber composition.

Specification of Strainer
Screen Mesh 1: Mesh size 0.700 mm
Screen Mesh 2: Mesh size 0.090 mm
Screen Mesh 3: Mesh size 0.170 mm
Screen Mesh 4: Mesh size 0.700 mm

Comparative Example 5

An unvulcanized rubber composition is prepared in the same manner as in Example 1, except that the specification (mesh sizes of screen meshes) of a strainer for performing straining used in Example 1 is changed as follows, and a charging roll is obtained using the unvulcanized rubber composition.

Specification of Strainer
Screen Mesh 1: Mesh size 0.600 mm
Screen Mesh 2: Mesh size 0.250 mm
Screen Mesh 3: Mesh size 0.250 mm
Screen Mesh 4: Mesh size 0.600 mm Evaluation Measurement of Average Dispersion Degree of Aggregates of Inorganic Particles Test pieces of the conductive elastic layer, that have a size of 10 mm×10 mm×10 mm, are collected from the charging rolls obtained in the respective examples. The test pieces are collected from five locations in a direction of the shaft of the roll.

Using the collected test pieces, a dispersion degree of aggregates of the inorganic particles is measured using a measuring instrument (manufactured by Daihan Co., Ltd., MARK IIIa) based on American Society for Testing and Materials (ASTM)-B method. An average value of the dispersion degrees of the aggregates of the inorganic particles in the five test pieces is set as an average dispersion degree of the aggregates of the inorganic particles. In the ASTM-B method, a dispersion degree D (%) is calculated based on the following expression:

$$D = 100 - (S \times U)/L$$

In the expression, D represents a dispersion degree (%), S represents a ratio of area swelling by the solvent, U represents a total capacity (%) of the inorganic particles, and L represents (specific gravity (g/cm$^3$) of mixture×PHR of inorganic particles)/(specific gravity (g/cm$^3$) of inorganic particles× total PHR of mixture).

Measurement of Maximum Particle Diameter of Aggregates of Inorganic Particles

Test pieces of the conductive elastic layer, that have a size of 10 mm×10 mm×10 mm, are collected from the charging rolls obtained in the respective examples. The test pieces are collected from five locations in a direction of the shaft of the roll.

A cross-section of the collected test piece is irradiated with light in a direction inclined at an angle (acute angle) of 45° and a reflection image is confirmed using a microscope to measure sizes of all of the observed aggregates of the inorganic particles. Specifically, the reflection image is binarized and a ratio of white contrast portions is calculated to measure sizes of all of the observed aggregates of the inorganic particles. The measurement is performed using five test pieces and a particle diameter of the largest aggregate of the inorganic particles is set as a maximum particle diameter of the aggregates of the inorganic particles.

Measurement of Weight Ratio of Rubber Material to Inorganic Particles in Unvulcanized Rubber Composition In the process of manufacturing the charging rolls obtained in the respective examples, the unvulcanized rubber compositions before and after straining are collected by 5 g. The collected unvulcanized rubber compositions before and after straining are baked using an electric heating furnace and ash is measured from the weight of the residues. A ratio of the ash to the unvulcanized rubber composition before baking is calculated as a weight ratio of the rubber material to the inorganic particles (inorganic particles/rubber material).

Specifically, the sum of the content ratio of the inorganic filler and the content ratio of the inorganic conductive material is set as a content ratio of the inorganic particles, and the content ratios of the inorganic particles before and after straining are measured to measure a difference therebetween. Five measurement locations are sampled before and after straining to measure the content ratios and an average value thereof is obtained. The specific method of measuring the content ratios is as follows. The measurement of the content ratios is performed using a measuring instrument "TG-DTA 6200 (manufactured by Hitachi High-Tech Science Corporation)".

As for the content ratio of the inorganic filler, the unvulcanized rubber compositions before and after straining are baked for 3 hours at 850° C. under oxygen atmosphere using the electric heating furnace and the weight of residues is measured to calculate the content ratio of the inorganic filler based on the following expression: content ratio of inorganic filler (% by weight)=$m_1/m_0$ (In the expression, $m_0$ represents a weight (g) of the test piece and $m_1$ represents a weight (g) of the residues after heating under oxygen atmosphere.)

As for the content ratio of the inorganic conductive material (in the examples, the content ratio of the carbon black), the unvulcanized rubber compositions before and after straining are immersed in methyl ethyl ketone (MEK) and left for 24 hours, and the rubber materials are extracted and subjected to filtering and drying, and then baked for 3 hours under nitrogen and oxygen atmosphere, respectively. The weight of the residues is measured and the content ratio of the inorganic conductive material is calculated based on the following expression: content ratio of inorganic conductive material (% by weight)=$(m_2-m_3)/m_0$ (In the expression, $m_0$ represents a weight (g) of the test piece, $m_2$ represents a weight (g) of the residues after heating under nitrogen atmosphere after extraction of the rubber material of the test piece, and $m_3$ represents a weight (g) of the residues after heating under oxygen atmosphere after extraction of the rubber material of the test piece.)

Evaluation of Unevenness in Image Density

Each of the charging rolls obtained in the examples is mounted as a charging unit of a color copier DocuCentre Color 400CP: manufactured by Fuji Xerox Co., Ltd. Using color toners (a cyan toner, a magenta toner, a yellow toner, and a black toner) for a color copier DocuCentre Color 400CP, a print test (23° C., 50% RH) is performed on 10 sheets of A4.

A: There are no defects such as unevenness in image density.

B: Very slight unevenness in image density occurs.

C: Slight unevenness in image density occurs.

D: Unevenness in image density occurs so that there is a problem in practical use.

TABLE 1

|  | Content Ratio of Inorganic Particles in Unvulcanized Rubber Composition (% by weight) | | Average Dispersion Degree of Aggregates of Inorganic Particles (%) | Maximum Particle Diameter of Aggregates of Inorganic Particles (μm) | Unevenness in Image Density |
|---|---|---|---|---|---|
|  | Before Straining | After Straining | | | |
| Example 1 | 17.2 | 17.2 | 97.3 | 32 | A |
| Example 2 | 17.1 | 16.3 | 99.8 | 15 | A |
| Example 3 | 17.2 | 17.2 | 96.5 | 115 | A |
| Example 4 | 17.1 | 17.1 | 98.5 | 25 | A |
| Example 5 | 17.1 | 17.1 | 97.5 | 46 | A |
| Example 6 | 17.2 | 17.2 | 98.5 | 20 | A |

TABLE 1-continued

| | Content Ratio of Inorganic Particles in Unvulcanized Rubber Composition (% by weight) | | Average Dispersion Degree of Aggregates of Inorganic Particles (%) | Maximum Particle Diameter of Aggregates of Inorganic Particles (μm) | Unevenness in Image Density |
|---|---|---|---|---|---|
| | Before Straining | After Straining | | | |
| Example 7 | 17.1 | 17.1 | 96.7 | 110 | A |
| Example 8 | 17.2 | 17.2 | 95.5 | 190 | A |
| Comparative Example 1 | 17.5 | 17.2 | 85.7 | 320 | D |
| Comparative Example 2 | — | — | — | — | — |
| Comparative Example 3 | 17.2 | 17.2 | 92.2 | 245 | C |
| Comparative Example 4 | 17.2 | 17.2 | 93.2 | 210 | C |
| Comparative Example 5 | 17.2 | 17.2 | 95.5 | 220 | C |

From the above results, it is found that in the examples, good results are obtained in the evaluation of unevenness in image density as compared to the comparative examples. Accordingly, it is found that in the examples, charging rolls in which the occurrence of unevenness in charging is prevented are obtained as compared to the comparative examples.

In Comparative Example 2, the unvulcanized rubber composition is not allowed to pass through the strainer and it is thus not possible to perform the straining. Whereby, it is not possible to manufacture a charging roll.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A charging member comprising:
a conductive support; and
a conductive elastic layer that is provided on an outer peripheral surface of the conductive support and includes a rubber material and inorganic particles, and in which an average dispersion degree of aggregates of the inorganic particles is 95% or greater and a maximum particle diameter of the aggregates of the inorganic particles is 200 μm or less.

2. The charging member according to claim 1,
wherein the conductive elastic layer is formed using an unvulcanized rubber composition that contains an unvulcanized rubber material and inorganic particles and is subjected to straining.

3. The charging member according to claim 2,
wherein the straining is performed using a strainer having a breaker plate and a plurality of screen meshes.

4. The charging member according to claim 2,
wherein a change in a weight ratio of the unvulcanized rubber material to the inorganic particles in the unvulcanized rubber composition is within 1.0% before and after straining.

5. The charging member according to claim 1,
wherein the conductive elastic layer is formed by molding an unvulcanized rubber composition containing an unvulcanized rubber material and inorganic particles into a layer shape on the outer peripheral surface of the conductive support through extrusion molding, and by then performing vulcanization.

6. A charging unit comprising:
the charging member according to claim 1.

7. A process cartridge that is detachable from an image forming apparatus, the cartridge comprising:
an image holding member; and
the charging unit according to claim 6 that charges the image holding member.

8. An image forming apparatus comprising:
an image holding member;
the charging unit according to claim 6 that charges the image holding member;
a latent image forming unit that forms a latent image on a charged surface of the image holding member;
a developing unit that develops the latent image formed on the surface of the image holding member with a toner to form a toner image; and
a transfer unit that transfers the toner image formed on the surface of the image holding member to a recording medium.

9. A method of manufacturing a charging member that includes a conductive support, and a conductive elastic layer that is provided on an outer peripheral surface of the conductive support and includes a rubber material and inorganic particles, and in which an average dispersion degree of aggregates of the inorganic particles is 95% or greater and a maximum particle diameter of the aggregates of the inorganic particles is 200 μm or less, the method comprising:
subjecting an unvulcanized rubber composition to straining; and
molding the unvulcanized rubber composition into a layer shape on the outer peripheral surface of the conductive support through extrusion molding and then performing vulcanization to form the conductive elastic layer.

10. The method of manufacturing a charging member according to claim 9,
wherein the straining is performed using a strainer having a breaker plate and a plurality of screen meshes.

11. The method of manufacturing a charging member according to claim 9, wherein a change in a weight ratio of the unvulcanized rubber material to the inorganic particles in the unvulcanized rubber composition is within 1.0% before and after straining.

* * * * *